United States Patent [19]

Happ et al.

[11] 3,837,818

[45] Sept. 24, 1974

[54] ELECTRICAL CONTACT ARM MATERIAL AND METHOD OF MAKING

[75] Inventors: Marvin B. Happ, Hingham, Mass.; Leonard A. Weston, Newark, Del.; Carl Redfield, N. Attleboro, Mass.

[73] Assignee: Texas Instruments Incorporated, Dallas, Tex.

[22] Filed: Sept. 11, 1972

[21] Appl. No.: 288,204

[52] U.S. Cl.................. 29/196.3, 29/199, 29/196.6
[51] Int. Cl............................................ B32b 15/00
[58] Field of Search........................... 29/199, 196.3

[56] References Cited
UNITED STATES PATENTS

| | | | |
|---|---|---|---|
| 2,514,873 | 7/1950 | Keene | 29/196.3 |
| 2,558,093 | 6/1951 | Kinney | 29/196.3 |
| 2,718,690 | 9/1955 | Ulam | 29/196.3 |
| 3,000,085 | 9/1961 | Green | 29/199 |
| 3,198,609 | 8/1965 | Cape | 29/196.3 |
| 3,212,865 | 10/1965 | Miller | 29/196.3 |
| 3,251,660 | 5/1966 | Finsterwalder | 29/196.3 |
| 3,367,754 | 2/1968 | Dugan | 29/199 |

Primary Examiner—Hyland Bizot
Attorney, Agent, or Firm—Harold Levine; John A. Haug; James P. McAndrews

[57] ABSTRACT

An inexpensive but improved composite strip material for use in making resilient electrical contact arms and the like is shown to comprise a strip of composite, electrically-conductive spring material having a layer of copper metallurgically bonded between outer layers of hardened stainless steel, at least one of these stainless steel layers having a stripe of solder adhered to the stainless steel material extending along the length of the composite spring material and preferably having a stripe of precious metal material displaying low electrical contact surface resistance properties extending along the length of the spring material. The solder stripe is provided on the stainless steel surface of the spring material by fluxing the stainless steel surface, by depositing a molten solder stripe on the fluxed strip surface, and by rapidly chilling the spring material as the solder is deposited thereon for solidifying the solder stripe in such a way as to assure adherence of the solder stripe to the stainless steel spring surface.

3 Claims, 4 Drawing Figures

ELECTRICAL CONTACT ARM MATERIAL AND METHOD OF MAKING

Resilient electrical contact arms for computer switches and the like are commonly blanked from strips of spring materials such as nickel-plated beryllium copper which have stripes of solder and of low electrical contact resistance materials on one of the nickel-plated spring surfaces, thereby to provide each blanked contact arm with a small precisely located portion of solder and of the low contact resistance material thereon. Usually, the contact arms are blanked and formed but are left attached to a web portion of the spring strip so that the contact arms are carried by the strip web and are cut from the web as the contact arms are assembled in switches. In this arrangement, the beryllium copper component of the strip material provides each contact arm with desired spring and electrical conductivity properties; the nickel plating protects the beryllium copper against corrosion and permits the solder to adhere to the spring surface; the solder stripe provides each contact arm with enough solder to permit solder attachment of an electrical lead to the arm; and the low contact resistance stripe provides each arm with an electrical contact surface.

While this prior art system has many advantages, it is found that the strip material used in making the contact arms is quite expensive and efforts to reduce this material cost while retaining all of the above-described strip properties and functions have been unsuccessful. Further, when the solder portions provided in the prior art contact arm are melted for lead attachment thereto, the solder tends to run off the original solder location on the arm and tends to interfere with assembly of the arm in a switch.

The improved strip material for use in making resilient electrical contact arms as provided by this invention embodies an inexpensive, composite, electrically-conductive spring material having a layer of copper metallurgically bonded between two outer layers of hardened stainless steel. Preferably a composite metal tape having a layer of gold bonded to a backing layer of cupronickel is welded to one of the stainless steel surfaces of the composite spring material to form a stripe of low electrical contact surface resistance properties. In accordance with this invention solder stripe is provided on one of the outer, stainless steel surfaces of the composite spring material in a particular way by depositing a liquid flux on the strip of composite spring material as the strip is advanced from a supply, by depositing a stripe of molten solder on the fluxed stainless steel spring surface, and by rapidly chilling the spring material as the molten solder is deposited thereon for solidifying the solder substantially as soon as it is deposited on the spring surface. In this arrangement, the solder is found to be strongly adhered to the stainless steel spring surface continuously and uniformily along the spring surface even though stainless steels are difficult to wet with solders. Most important, when contact arms formed from this inexpensive material are to be assembled in switches and when solder portions on the arms are melted for attaching electrical leads, the tendency of the stainless steel spring surface to resisting wetting by the solder serves to retain the melted solder in its original location on the contact arm and prevents solder runoff or displacement such as might interfere with assembly of the contact arm in a switch. On the other hand, it is found that the solder is adapted to form a secure solder attachment of a lead to the arm at the original solder location on the arm.

Other objects, advantages and details of the electrical contact arm material of this invention and of the process of this invention appear in the following detailed description of preferred embodiments of the invention, the description referring to the drawings in which.

Figure 1:
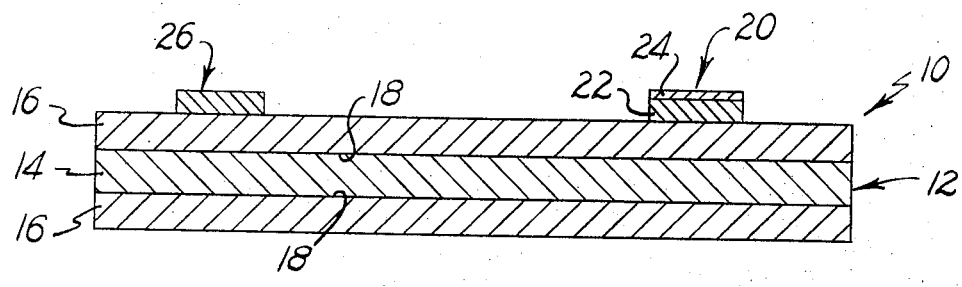
FIG. 1 is a section view to enlarged scale transverse to the longitudinal axis of the composite electrical contact arm strip material provided by this invention.

Referring to the drawings, 10 in FIG. 1 illustrates the novel and improved composite, electrically conductive contact arm strip material of this invention. As shown in FIG. 1, this composite material 10 includes a composite base strip material 12 having a core or intermediate layer 14 of a copper material such as electrolytic tough pitch copper or oxygen free high conductivity copper or the like which is snadwiched between and metallurgically bonded to two outer layers 16 of stainless steel substantially throughout the interfaces 18 between the base strip layers. Preferably the stainless steel materials in the layers 16 are in at least partially hardened condition and the relative thicknesses of the layers 14 and 16 are selected so that the base strip material displays desired spring properties and a desired level of electrical conductivity. That is, the layers 16 are formed of work-hardened austenitic stainless steels or of age or precipitation hardened stainless steels or the like which contribute the necessary spring characteristics to the base strip 12 while the copper core layer 14 of the base strip provides the desired level of electrical conductivity, the central disposition of the layer 14 permitting use of a fairly thick layer of copper where required without interfering with the desired elastic behavior of the base strip 12.

Typically, for example, the stainless steel materials of the layers 16 comprise age hardened stainless steels such as the stainless steel sold under the designation Armco PH15-7Mo which has the approximate composition, by weight, of 0.09 percent (max.) carbon, 1.00 percent (max.) manganese, 1.00 percent (max.) silicon, 14.00 to 16.00 percent chromium, 6.50 to 7.75 percent nickel, 2.00 to 3.00 percent molybdenum, 0.75 to 1.50 percent aluminum and the balance iron or work-hardened austenitic stainless steels such as the stainless steel sold under the designation SAE 301 which has the approximate composition, by weight, of 0.15 percent (max.) carbon, 2.00 percent (max.) manganese, 1.00 percent (max.) silicon, 16.00 to 18.00 percent chromium, 6.00 to 8.00 percent nickel, 0.045 percent (max.) phosphorous, 0.030 percent (max.) sulfur, and the balance iron. If desired, the copper layer 14 of the base strip material 12 is formed of a hardened copper alloy having the nominal composition by weight of 0.12 percent zirconium and the balance copper. With materials such as these embodied in the layers of the base strip 12 and with the layers 16 having substantially equal thicknesses in the range from about 25 to 38 percent of the total thickness of the base strip 12, the base strip material is adapted to display at least about 30 percent IACS electrical conductivity and to display spring properties corresponding to those of monometallic conductive spring materials such as beryllium copper. Preferably base strip materials 12 having widths of about 1 to 4 inches and thicknesses on the order of 0.005 to 0.060 inches are embodied in the composite materials 10 provided by this invention. As such composite stainless steel-copper-stainless steel conductive spring materials are known, they are not further described herein and it will be understood that the base strip 12 displays spring and electrical conductive properties customarily employed in electrical contact arms and that the base strip has stainless steel outer surfaces.

Figure 2:
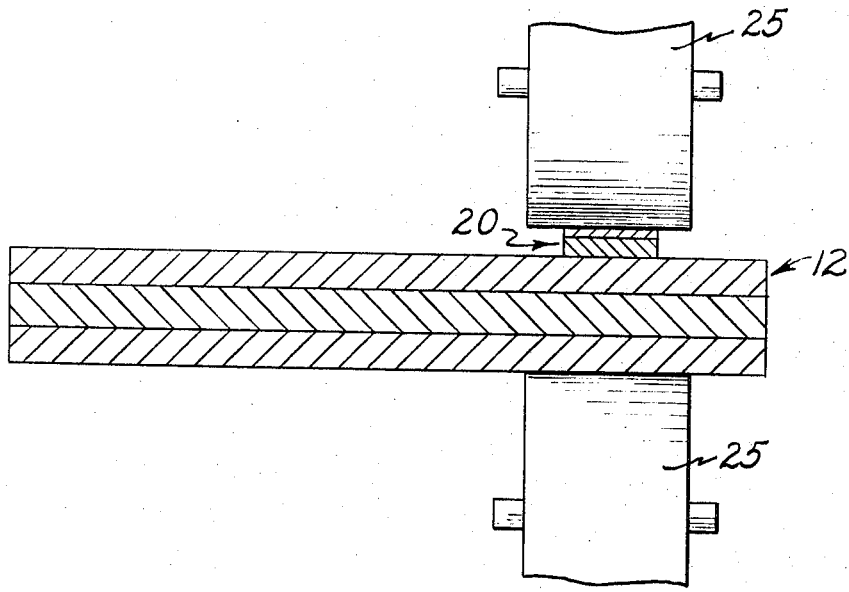
FIG. 2 is a diagrammatic view illustrating steps in the process of this invention.

As shown in FIG. 1, the contact arm material 10 also preferably incorporates a stripe 20 of a metal material which is characterized by low electrical contact surface resistance properties and which is secured to the base strip 12 extending longitudinally along the length of the base strip. Preferably the stripe 20 embodies a precious metal material such as a composite metal tape having a layer 22 of cupronickel alloy (preferably 70 percent cooper and 30 percent nickel by weight) and a layer 24 of gold or silver as of a gold-silver alloy. Alternately, the stripe 20 embodies a tape having a backing layer 22 of stainless steel or other readily welded material and a precious metal layer 24 of palladium or platinum or alloys thereof. As will be understood, the backing layer 22 permits easy handling of the stripe material while permitting use of a thin precious metal layer 24 to provide low contact surface resistance properties at low cost, the tape typically being about 0.075 inches wide and 0.006 inches thick with the precious metal layer 24 having a thickness of about 0.0007 inches. The composite tape layer 22 which may have weld projections thereon (not shown) is resistance welded to the base strip 12 between welding electrodes 25 as indicated in FIG. 2 or is attached to the base strip 12 in any other conventional manner. As such composite metal contact tapes and the attachment of such tapes to base metal materials are well known, the materials of the strip 20 are not further described herein and it will be understood that the stripe material provides the desired low contact surface resistance properties and is secured to the base strip 12 in a precisely controlled location extending along the length of the strip 12.

Figure 3:
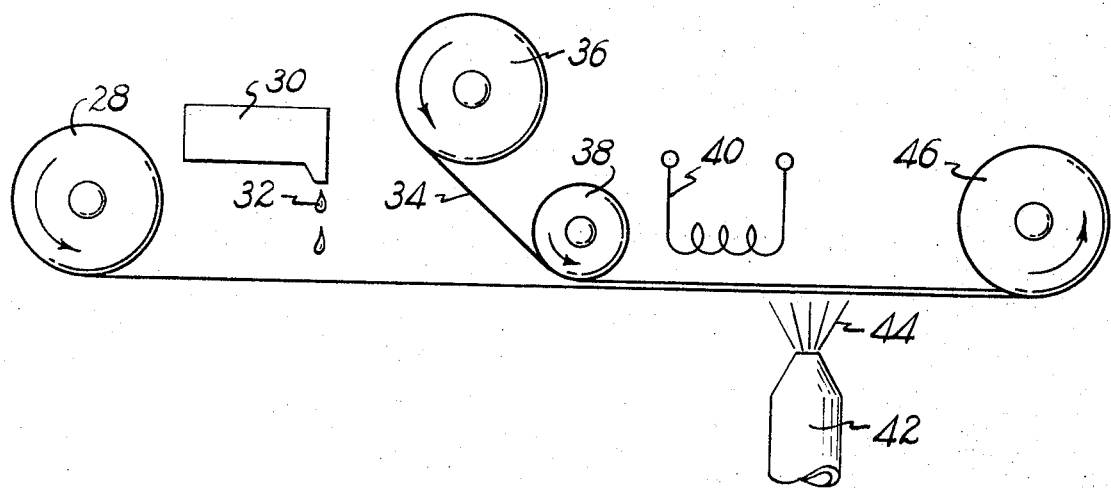
FIG. 3 is a section view to enlarged scale transverse to the longitudinal axis of the composite electrical contact arm strip material of this invention illustrating additional steps in the process of this invention.

In accordance with this invention, the stainless steel-copper-stainless steel base strip material 12 is also provided with a stripe 26 of solder material which is also precisely located on the base strip 12 extending along the length of the strip 12 and which is strongly adherent to a stainless steel surface of the base strip. For accomplishing formation of this adherent solder stripe in accordance with this invention, the base strip 12, either before or after attachment of the stripe 20 thereto, is advanced from a pay-off reel 28 as shown in FIG. 3 so that a stainless steel surface of the strip is passed beneath a container 30 from which a liquid flux is dripped or otherwise deposited on the stainless steel surface as is illustrated at 32 in FIG. 2. The flux 32 preferably comprises a combination of hydrochloric acid and zinc chloride in an aqueous base but other flux materials conventionally used in soldering to stainless steel surfaces are also used within the scope of this invention. The flux 32 is deposited, by dripping, brushing, flowing or spraying onto the stainless steel strip surface in any conventional manner which assures that the flux covers at least a selected band of the strip surface extending continuously along the length of the strip 12.

In accordance with this invention, the fluxed strip 12 is then further advanced and a stripe of molten solder material is deposited along the fluxed strip surface in any conventional manner. For example, a solder tape 34 of the desired width and thickness is fed from a pay-off reel 36 onto the fluxed surface of the strip 12 and is held engaged with the advancing strip 12 by a guide roll 38 while the solder material is melted as indicated by the electrical heating coil 40 in FIG. 3, thereby to continuously deposit molten solder material along the strip 12 as the strip is advanced. Typically, the solder has a composition by weight of about 1 percent cadmium, 3.5 percent silver, 0.35 percent antimony and the balance tin and has a width of about 0.250 inches and a thickness of about 0.002 inches although any conventional solder materials conventionally used with stainless steel materials are used within the scope of this invention. Further, although the molten solder material 34 is deposited on the strip 12 by melting a solder tape in contact with the strip, the molten solder stripe is also deposited on the strip in any other known manner within the scope of this invention.

In accordance with this invention, one side of the base strip 12 is chilled below room temperature, and preferably below a temperature of about 32° F., as the molten solder material 34 is deposited on the opposite stainless steel surface of the advancing base strip 12, this chilling being rapid enough to prevent dewetting of the surface of the strip 12 by the molten solder and so that the solder material is solidified fast enough to form the solder stripe 26 in strong adherence to the stainless steel surface of the strip 12. For example, although various conventional chilling means are used within the scope of this invention, it is preferred that a nozzle 42 be arranged beneath the strip 12 to release carbon dioxide gas 44 from a cylinder (not shown) wherein the carbon dioxide is held in liquid form under pressure to direct the gas onto the strip 12 for rapidly chilling the strip to solidify the molten solder 34 to form the stripe 26 substantially as soon as the molten solder is deposited. The base strip 12 with its adherent solder stripe 26 solidified thereon is then coiled on the driven take-up reel 46 as shown in FIG. 2, this driving of the take-up reel serving to advance the strip 12 as above described.

Figure 4:
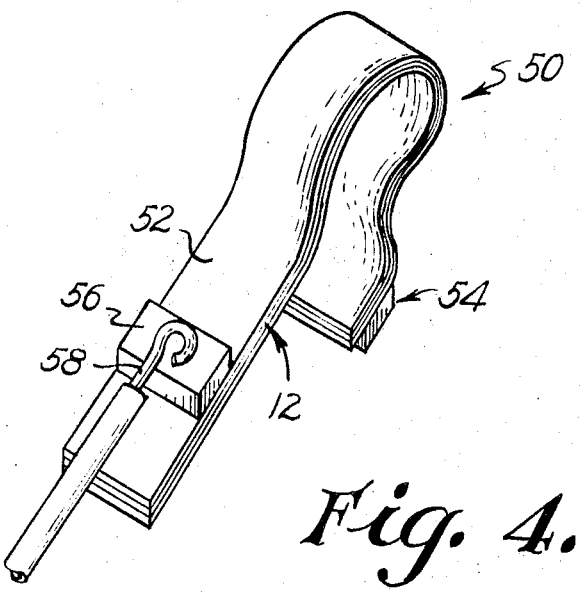
FIG. 4 is a perspective view of a contact arm made from the composite metal strip material provided by this invention.

In this regard, it will be understood that solder materials tend to wet even fluxed stainless steel surfaces only with difficulty and that, when a stripe of molten solder is deposited on a stainless steel surface, the low thermal conductivity of the stainless steel tends to retard solidifying of the molten solder, thereby giving the molten solder an opportunity to dewet the stainless steel surface initially engaged by the molten solder and to ball-up or draw away from the initially engaged portions of the stainless steel strip surface. On the other hand, where contact arms are to be blanked from a strip material but are to be left attached to a web portion of the strip through automated assembly of the contact arms in switches, it is important that a solder stripe formed on the contact arm strip material be continuously and strongly adherent to the stainless steel surface of the strip 12 throughout the length of the strip, thereby to assure provision of an adherent solder portion on each blanked contact arm. The rapid cooling of the advancing strip 12 as the molten solder 34 is deposited thereon is found to provide the strong and continuous adherence of the solder stripe 26 to the base strip 12. In this way, the strip material 10 of this invention is provided with desirable spring and electrical conductivity properties through use of the inexpensive composite stainless steel-copper-stainless steel spring strip 12 but the solder stripe 26 is accurately and economically formed with strong adherence to a stainless steel surface of the spring strip 12. When a contact arm 50 as shown in FIG. 4 is thereafter formed and blanked from the composite strip 10, the contact arm includes an electrically conductive spring portion 52 formed by a portion of the strip 12, an electrical contact 54 formed from a portion of the stripe 20, and a solder portion 56 formed from the solder stripe 26, the solder portion 56 being adapted to be remelted for soldering an electrical lead 58 to the contact arm. The composite material 10 of this invention therefore provides all of the functions and properties of the contact arm strip materials of the prior art but does so using less expensive component materials. Most important, when the solder portion 56 on the contact arm 50 is remelted for attaching a lead to the arm, the tendency of the stainless steel surface of the base strip material 12 to resist wetting by the solder prevents solder runoff from its illustrated location on the contact arm 50. All of the solder portion 56 therefore is used in the lead attachment and there is no solder displacement such as could interfere with assembly of the contact arm 50 in a switch. However, it is also found that, although additional fluxing may be used to assure solder adherence to an electrical lead, such fluxing is not required for obtaining solder adherence to the contact arm 50 and remelting and recooling of the solder portion 56 again achieves strong adherence of the solder to the stainless steel surface of the arm 50 at the original solder location on the arm.

It should be understood that although preferred embodiments of this invention have been described by way of illustration, this invention includes all modifications and equivalents of the disclosed embodiments falling within the scope of the appended claims.

We claim:

1. A composite strip material for use in making electrical contact arms and the like comprising a strip of composite electrically conductive spring material having a layer of copper sandwiched between and metallurgically bonded to two outer layers of stainless steel, at least one of said stainless steel layers having a stripe of solder material continuously adhered thereto extending along the length of said strip of spring material, and having a stripe of composite metal tape welded to said strip of spring material extending along the length of said strip of spring material, said composite metal tape embodying a layer of cupronickel alloy welded to said spring material and a layer of gold metallurgically bonded to said layer of cupronickel alloy.

2. A composite strip material as set forth in claim 1 wherein said stainless steel layers of said spring material embody at least partially hardened stainless steel alloys selected from the group of alloys comprising an alloy having an approximate composition by weight of 0.09 percent (max.) carbon, 1.00 percent (max.) manganese, 1.00 percent (max.) silicon, 14.00 to 16.00 percent chromium, 6.50 to 7.75 percent nickel, 2.00 to 3.00 percent molybdenum, 0.75 to 1.50 percent aluminum and the balance iron and an alloy having an approximate composition by weight of 0.15 percent (max.) carbon, 2.00 percent (max.) manganese, 1.00 percent (max.) silicon, 16.00 to 18.00 percent chromium, 6.00 to 8.00 percent nickel, 0.045 percent (max.) phosphorous, 0.030 percent (max.) sulfur, and the balance iron, said stainless steel layers being of substantially equal thickness comprising from about 25 to 38 percent of the total thickness of said composite spring material.

3. A composite strip material for use in making electrical contact arms and the like comprising a strip of composite electrically conductive spring material having a layer of copper sandwiched between and metallurgically bonded to two outer layers of stainless steel, said stainless steel layers of said spring material embodying at lease partially hardened stainless steel alloys selected from the group of alloys comprising an alloy having an approximate composition by weight of 0.09 percent (max.) carbon, 1.00 percent (max.) manganese, 1.00 percent (max.) silicon, 14.00 to 16.00 percent chromium, 6.50 to 7.75 percent nickel, 2.00 to 3.00 percent molybdenum, 0.75 to 1.50 percent aluminum and the balance iron and an alloy having an approximate composition by weight of 0.15 percent (max.) carbon, 2.00 percent (max.) manganese, 1.00 percent (max.) silicon, 16.00 to 18.00 percent chromium, 6.00 to 8.00 percent nickel, 0.045 percent (max.) phosphorous, 0.030 percent (max.) sulfur, and the balance iron, said stainless steel layers being of substantially equal thickness comprising from about 25 to 38 percent of the total thickness of said composite spring material, said spring material having a stripe of gold secured to said spring material extending along the length of said strip of spring material and at least one of said stainless steel layers having a stripe of solder material continuously adhered thereto extending along the length of said strip of spring material.

* * * * *